Figure 1:
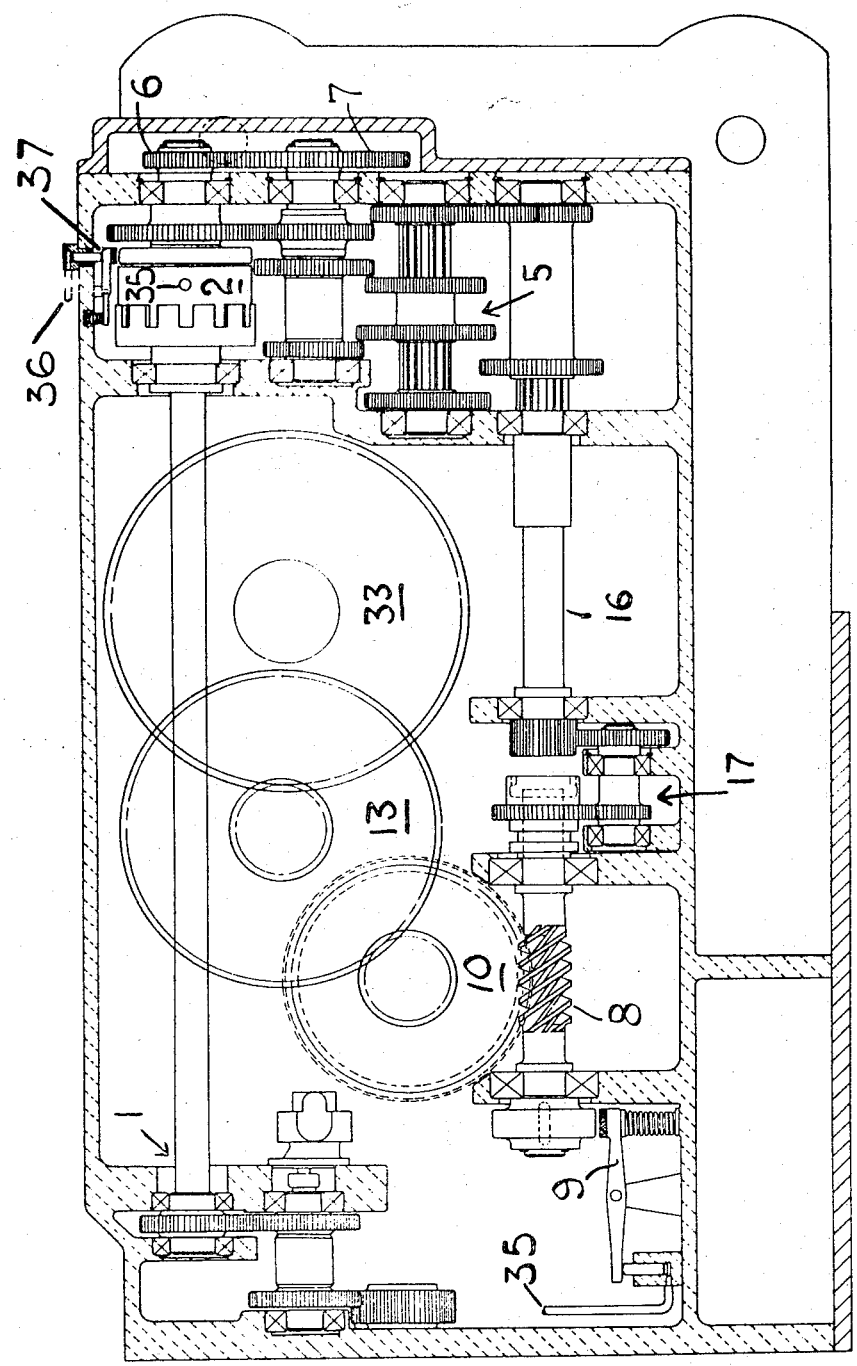

United States Patent [19]
Anderson

[11] 3,774,737
[45] Nov. 27, 1973

[54] HAULAGE MECHANISM FOR MINING MACHINES

[75] Inventor: Forrest Symington Anderson, Lanarkshire, Scotland

[73] Assignee: Anderson Mavor Limited, Lanarkshire, Scotland

[22] Filed: Aug. 20, 1971

[21] Appl. No.: 173,483

[30] Foreign Application Priority Data
Sept. 1, 1970 Great Britain............... 41,773/70

[52] U.S. Cl. ........... 192/56 F, 192/12 A, 192/18 A, 192/144, 254/187
[51] Int. Cl............................................. F16d 67/00
[58] Field of Search ............... 192/56 F, 144, 12 A, 192/3.57, 18 A, 4 R; 254/187

[56] References Cited
UNITED STATES PATENTS 3,419,117  12/1918  Conway.............................. 192/56 F
1,938,720  12/1933  Preble................................ 192/144
3,592,318  7/1971   Lyonsetal.......................... 192/56 F Primary Examiner—Charles J. Myhre
Assistant Examiner—Randall Heald
Attorney—Robert C. Hauke et al.

[57] ABSTRACT

The invention relates to overload cut-out mechanism for mechanical haulage mechanism for mining machines in which the cut-out mechanism comprises a friction clutch device driven by a worm wheel device and operable when a driven member and driving member of the clutch device is overloaded and rotate relative to one another to actuate a hydraulic system to release spring pressure means on the clutch plates, and disengage a hydraulic driving clutch connecting the mechanism to a power source and at the same time apply brake means to the worm wheel device.

9 Claims, 3 Drawing Figures

INVENTOR
FORREST S. ANDERSON

INVENTOR
FORREST S. ANDERSON
BY Hauke, Gifford & Patalidis
ATTORNEYS

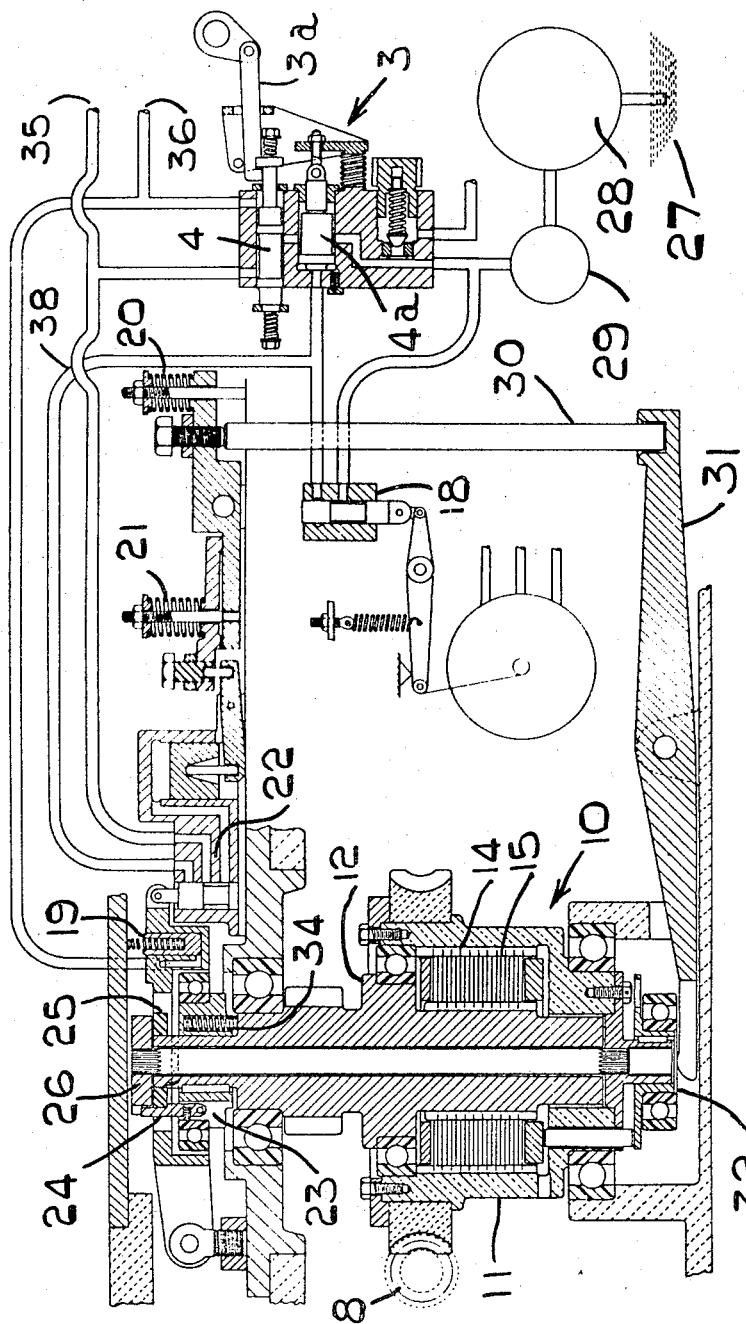

HAULAGE MECHANISM FOR MINING MACHINES

This invention relates to mechanical haulage mechanism for mining machines.

More specifically the invention is directed to overload cut-out mechanism suitable for high powered haulage mechanism for mining machines.

In mechanical high powered haulage mechanism for mining machines of 30 horsepower and upward, difficulty has been found in providing a satisfactory overload cut-out mechanism using friction clutches as these normally used slip until cut-off by an operator. During the period of slip damage can be caused to the clutch. It has therefore been the practice to use hydraulic mechanism for such high powered machines which can be provided with satisfactory cut-out mechanism.

An object of the present invention is to provide mechanical haulage mechanism for high powered haulage machines with overload cut-out mechanism comprising a clutch device which provides, upon relative movement of a driving and driven member of the clutch device, for substantially disconnecting or reducing the driving connection between the driving power source and the haulage chain or the like. Means may also be provided for applying brake means to the haulage chain or the like and arresting run-back of the haulage chain when released from load.

According to the invention haulage mechanism for mining machines comprises an hydraulically operated driving clutch operatively connected to gear selection mechanism for selecting a preferred haulage speed the output from the gear selection mechanism being operatively connected by worm wheel drive means through overload cut-out mechanism to a reduction gear train connected to the haulage chain or the like, the overload cut-out mechanism comprising a friction clutch device including a driving member and a driven member, clutch plates providing a driving connection between the driving and driven members and releasable pressure means for the clutch plates, means associated with the overload clutch device operative to release the pressure means for the clutch plates when the driving and driven members rotate relative to one another and to actuate control means for the driving clutch.

Figure 2:
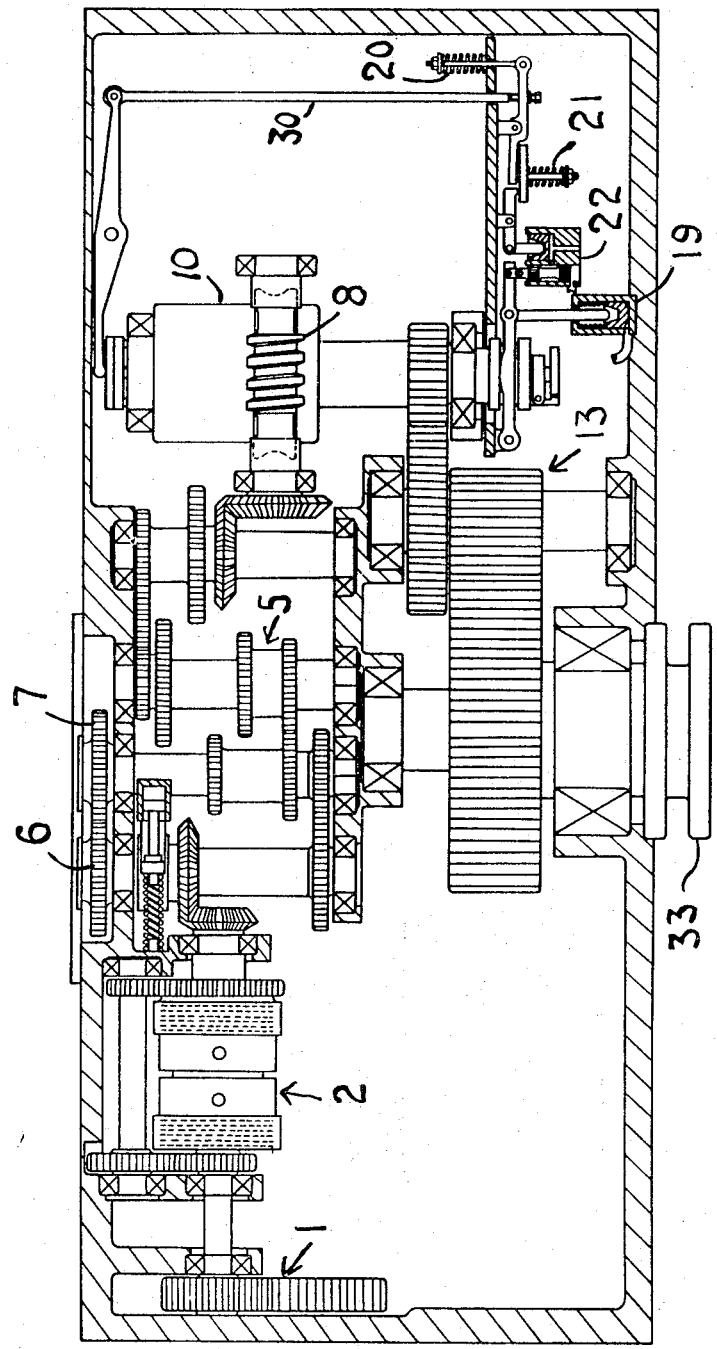

Embodiments of the invention are illustrated in the accompanying drawings in which:

FIG. 1 is a schematic illustration of the layout of haulage mechanism according to the invention, FIG. 2 is similar to FIG. 1 illustrating another embodiment of the invention, FIG. 3 is a detailed view of the cut-out mechanism of FIGS. 1 and 2.

Referring to FIGS. 1 and 3 of the drawings, 1 denotes driving means for the haulage mechanism operatively connected to a hydraulically operated driving clutch device 2 provided with hydraulic control means indicated generally at 3 and operable to select either an "ON" driving position or an overload resetting position with an intermediate "OFF" position and includes valve means 4, and a plunger 4a. The control means 3 when in the operative "ON" position is latched by a latch lever 3a and biased to return to the "OFF" position when released.

The driving clutch device 2 is operatively connected to gear selection mechanism 5 in which two of the gear wheels 6 and 7 are readily replaceable to provide a different gear ratio for the mechanism and gear selector means (not shown) is provided for selecting a predetermined gear ratio in forward or reverse direction.

An output shaft 16 from the gear selection mechanism 5 is selectively connected directly to the worm drive device 8 or through a reduction gear train 17 to the worm drive device 8.

An overload clutch device denoted generally at 10 comprises a friction clutch including a driving member 11 adapted to be operatively connected to the worm drive means 8 and a driven member 12 operatively connected to a reduction gear train 13 which is connected to a means 33 for driving a haulage chain or the like.

Referring to FIG. 3 the overload clutch device 10 is provided with clutch plates 14 and 15 which provide a driving connection between the driving member 11 and driven member 12 and a constant pressure for the clutch plates is provided by spring means 20. Second spring means 21 applies a releasable pressure to the clutch plates. Hydraulically operated valve means 22 provides for applying and releasing the second spring pressure to the plates.

The pressure of the springs 20, 21 is applied to the clutch plates through an adjustable rod member 30 engageable with one end of a pivotable lever 31, the other end of the lever 31 engages a presser cap 32 journalled on the end of the driving member and in operative engagement with the clutch plates.

Means for actuating the valve means 22 is provided by axial movement of a spring-urged sleeve 23 rotatably mounted on the driven member.

The sleeve 23 is provided with annularly spaced latch members 24 which are pivoted to the sleeve 23 to releasably engage the edge portion of a retaining member 25 in the form of a disc mounted on the driven member.

A cam member 26 rotatable with the driving member and operatively engageable with the latch members disengages the latch members 24 from the retaining member 25 when the driving and driven members rotate relative to one another whereby the sleeve member 23 is free to move axially under the influence of springs 34 to actuate the valve 22 in a hydraulic circuit.

A hydraulic circuit illustrated in FIG. 3 is supplied from a fluid source 27 through a pump 28 and filter 29 and connects the control means 3, the valve means 22 and a valve 18 for an electrical overload cut-out.

When the control means 3 is in the "ON" position hydraulic pressure is applied through the valve 4 and a conduit 35 to the valve 22 which is operative to maintain the additional spring pressure 21 on the clutch plates 14, 15, and when the valve 22 is in its inoperative position and the spring pressure 21 is released. The hydraulic pressure is transmitted through the valve 22 and a conduit 38 to a plunger 4a to trip the latch 3a so that the control means 3 returns to its "OFF" position.

The conduit 35 is also connected to brake means 9 (FIG. 1) on the worm drive means 8 to hold the brake against spring means in an inoperative position while the valve 22 is in its operative position and when the valve 22 is in its inoperative position the pressure in conduit 35 is released to apply the brake 9 to the worm drive means 8.

The conduit 35 is also connected to the driving clutch 2.

A conduit 36 connected to the valve 4 provides pressure to a plunger device 19 connected to the sleeve 23 to reset the latch members 24 when the control means 3 is moved to the resetting position and also provides pressure to an anti-spin brake 37 (FIG. 1) on the gear selection mechanism 5.

An electrical overload valve 18 is connected to the hydraulic pressure source and is normally closed. In the event of an electrical overload the valve 18 is actuated to supply hydraulic pressure to the plunger 4a through the conduit 38 to release the latch lever 3a.

In operation the control means 3 is set to the "ON" position to actuate the valve 4 which is then held in the operative position by the latch lever 3a.

Hydraulic pressure is applied to the driving clutch 2 through the conduit 35 which is engaged to drive the worm drive device 8 through the gear mechanism 5 and 17. The worm drive device 8 is in driving relation through the overload clutch device 10 with the reduction gear train 13.

The sleeve 23, which is retained by the latch members 24 in engagement with the retaining member 25, holds the valve 22 in position to apply the additional spring pressure 21 to the clutch plates 14, 15 so that they are in full driving engagement.

The overload clutch device is operable on overload of the haulage mechanism which results in the driving and driven members of the overload clutch device rotating relative to one another.

When an overload occurs the overload clutch is operable to release the latch members 24 so that the sleeve 23 is free to move axially and actuate the hydraulic system through the valve 22 to reduce or substantially disconnect the driving connection between the worm drive device 8 and the reduction gear train 13 and to actuate the plunger 4a and control valve 4 to disengage the driving clutch 2 and apply the brake means to the mechanism.

When the additional spring pressure 21 is released from the clutch plates 14, 15 the overload clutch acts as a friction brake to arrest run back of the chain or the like.

The latch members 24 are reset in engagement with the retaining member 25 by the actuation of the plunger device 19 which moves the sleeve 23 axially against the bias of a spring 34 when the control means 3 is moved to the resetting position. At the same time the plunger device 19 actuates the valve 22 to re-apply the additional spring pressure 21 to the clutch plates so that the overload clutch is reset for operation when the control means is manually set to the "ON" position.

FIG. 2 of the drawings illustrates a further embodiment of the invention which is similar to that of FIGS. 1 and 3 except that a two speed hydraulically operated driving clutch 2 is provided and the reduction gear 17 is omitted.

The driving clutch 2 is connected to the hydraulic system through the conduits 35 and 36.

The control means 3 is operable to select either speed of the driving clutch 2 with an intermediate "OFF" position and is latched in either of the speed positions. The control means is biased when in either operative position to return to the "OFF" position when the latch means 3a is released.

What is claimed is:

1. Haulage mechanism for mining machines comprising a hydraulically operated driving clutch operatively connected to gear selection mechanism for selecting a preferred haulage speed, an output shaft on said gear selection mechanism, said output shaft operatively connected to worm wheel drive means, said worm wheel drive means connected through overload cut-out mechanism to a reduction gear train adapted to be connected to a haulage means, control mechanism for said driving clutch and cut-out mechanism, said cut-out mechanism, including a friction clutch device having a driving member and a driven member, clutch plates providing a driving connection between said driving and driven members, and releasable pressure means for said clutch plates, said releasable pressure means being actuated by a hydraulic system, said hydraulic system also being connected to said driving clutch, said cut-out mechanism operative upon the driving and driven members rotating relative to one another to actuate valve means in said hydraulic system to relieve said pressure means and thereby reduce the driving connection between said driving member and said driven member and to actuate the control mechanism to disengage the driving clutch.

2. Haulage mechanism as claimed in claim 1 in which the cut-out mechanism includes a sleeve member axially movable on the driven member, latch members mounted on said sleeve member, said latch members engageable with a retaining member to hold said sleeve member in a stressed axial position, a cam member on the driving member engageable with said latch members and operative to release said latch members from said retaining member when the driving and driven members rotate relative to one another to move said sleeve member axially, valve said means in said hydraulic system actuated by said sleeve member to release said releasable pressure means for said clutch plates and to actuate said control mechanism.

3. Haulage mechanism as claimed in claim 1 in which said pressure means for the clutch plates comprises a constant spring pressure and a releasable spring pressure.

4. Haulage mechanism as claimed in claim 1 in which the valve means includes a first valve member in said hydraulic system, latch means operatively engageable with said first valve member, said first valve member adapted to actuate said driving clutch when in latched position, a conduit in said hydraulic system connecting said first valve member to a second valve member, means for actuating said second valve member, said second valve member when in an operative position adapted to apply said pressure means to said clutch plates, said second valve member when in an inoperative position adapted to release said pressure means, and unlatch said first valve member.

5. Haulage mechanism for mining machines comprising a hydraulically operated driving clutch operatively connected to gear selection mechanism, an output shaft on said gear selection mechanism, said output shaft operatively connected to worm wheel drive means, said worm wheel drive means connected through overload cut-out mechanism to a reduction gear train, control mechanism operatively connected to said driving clutch and cut-out mechanism, said cut-out mechanism comprising a friction clutch device having a driving and driven member, clutch plates providing a driving connection between said driving and driven member, releasable spring pressure means for said clutch plates, said cut-out mechanism comprising a sleeve member axially movable on the driven member, latch members mounted on said sleeve member and engageable with a retaining member and adapted to hold said sleeve member in an axial stressed position, a cam member on said driving member engageable with said latch members and operative to unlatch said sleeve member when said driving and driven members rotate relative to one another, valve means in a hydraulic system actuated by said sleeve member, said valve means operative to release said pressure means to reduce the driving connection between the driving member and the driven member and to at the same time actuate said control mechanism for the driving clutch to disengage said driving clutch.

6. Haulage mechanism as claimed in claim 5 wherein said control mechanism comprises a first valve member in said hydraulic system, latch means engageable with said first valve member when in an operative position, said first valve member adapted to actuate said driving clutch, and a plunger member connected to said first valve member, said first valve member connected to said valve means and to brake means on said worm drive means, said valve means connected to said plunger member, said plunger member operable to release said latch means, said valve means adapted to actuate said plunger member when actuated by said sleeve member to release said latch means and apply said brake means.

7. Haulage mechanism for mining machines comprising a hydraulically operated driving clutch operatively connected to gear selection mechanism for selecting a preferred haulage speed, an output shaft on said gear selection mechanism, said output shaft operatively connected to worm wheel drive means, said worm wheel drive means connected through overload cut-out mechanism to a reduction gear train adapted to be connected to a haulage means, control mechanism for said driving clutch and cut-out mechanism, said cut-out mechanism, including a friction clutch device having a driving member and a driven member, clutch plates providing a driving connection between said driving and driven members and releasable pressure means for said clutch plates, said cut-out mechanism operative upon the driving and driven members rotating relative to one another to release the pressure means for the clutch plates and to actuate the control mechanism, said cut-out mechanism including a sleeve member axially movable on the driven member, latch members mounted on said sleeve member, said latch members engageable with a retaining member to hold said sleeve member in a stressed axial position, a cam member on the driving member engageable with said latch members and operative to release said latch members from said retaining member when the driving and driven members rotate relative to one another to move said sleeve member axially, valve means in a hydraulic system actuated by said sleeve member to release releasable pressure means for said clutch plate and to actuate said control mechanism.

8. Haulage mechanism for mining machines comprising a hydraulically operated driving clutch operatively connected to gear selection mechanism for selecting a preferred haulage speed, an output shaft on said gear selection mechanism, said output shaft operatively connected to worm wheel drive means, said worm wheel drive means connected through overload cut-out mechanism to a reduction gear train adapted to be connected to a haulage means, control mechanism for said driving clutch and cut-out mechanism, said cut-out mechanism including a friction clutch device having a driving member and a driven member, clutch plates providing a driving connection between said driving and driven members and releasable pressure means for said clutch plates, said cut-out mechanism operative upon the driving and driven members rotating relative to one another to release the pressure means for the clutch plates and to actuate the control mechanism, said control mechanism including a first valve member in a hydraulic system, latch means operatively engageable with said first valve member, said first valve member adapted to actuate said driving clutch when in a latched position, a conduit in said hydraulic system connecting said first valve member to valve means, means for actuating said valve means, said valve means when in an operative position adapted to apply said pressure means to said clutch plates, said valve means when in an inoperative position adapted to release said pressure means, and unlatch said first valve member.

9. Haulage mechanism for mining machines comprising a hydraulically operated driving clutch operatively connected to gear selection mechanism, an output shaft operatively connected to worm wheel drive means, said worm wheel drive means connected through overload cut-out mechanism to a reduction gear train, control mechanism operatively connected to said driving clutch and cut-out mechanism, said cut-out mechanism comprising a friction clutch device having a driving and driven member, clutch plates providing a driving connection between said driving and driven member, releasable spring pressure means for said clutch plates, said cut-out mechanism comprising a sleeve member axially movable on the driven member, latch members mounted on said sleeve member and engageable with a retaining member and adapted to hold said sleeve member in an axial stressed position, a cam member on said driving member engageable with said latch members and operative to unlatch said sleeve member when said driving and driven members rotate relative to one another, valve means in a hydraulic system actuated by said sleeve member, said valve means operative to release said pressure means and to actuate said control mechanism, said control mechanism comprises a first valve member in said hydraulic system, latch means engageable with said first valve member when in an operative position, said first valve member adapted to actuate said driving clutch, and a plunger member connected to said first valve member, said first valve member connected to said valve means and to brake means on said worm drive means, said valve means connected to said plunger member, said plunger member operable to release said latch means.

* * * * *

UNITED STATES PATENT OFFICE
CERTIFICATE OF CORRECTION

Patent No. 3,774,737          Dated November 27, 1973

Inventor(s) Forrest S. Anderson

It is certified that error appears in the above-identified patent and that said Letters Patent are hereby corrected as shown below:

Col. 2, line 35, after "member", insert --12--;

line 36, after "member", insert --11--;

line 37, after "members", insert --24--;

Col. 3, line 25, after "members", insert --11 and 12, respectively--;

line 27, after "clutch", insert --10--;

line 34, after "means", insert --9--.

Col. 4, line 30, delete "valve said" and insert --said valve--

Signed and sealed this 9th day of April 1974.

(SEAL)
Attest:

EDWARD M. FLETCHER, JR.
Attesting Officer

C. MARSHALL DANN
Commissioner of Patents